United States Patent
Matsuzaki

(10) Patent No.: US 9,258,569 B2
(45) Date of Patent: Feb. 9, 2016

(54) MOVING IMAGE PROCESSING METHOD, PROGRAM AND APPARATUS INCLUDING SLICE SWITCHING

(75) Inventor: Tomonori Matsuzaki, Hyogo (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 1126 days.

(21) Appl. No.: 13/000,976

(22) PCT Filed: Jun. 26, 2008

(86) PCT No.: PCT/JP2008/001679
§ 371 (c)(1),
(2), (4) Date: Apr. 21, 2011

(87) PCT Pub. No.: WO2009/157043
PCT Pub. Date: Dec. 30, 2009

(65) Prior Publication Data
US 2011/0188570 A1    Aug. 4, 2011

(51) Int. Cl.
*H04N 11/02* (2006.01)
*H04N 19/174* (2014.01)
*H04N 19/176* (2014.01)
*H04N 19/44* (2014.01)
*H04N 19/436* (2014.01)

(52) U.S. Cl.
CPC ........... *H04N 19/174* (2014.11); *H04N 19/176* (2014.11); *H04N 19/436* (2014.11); *H04N 19/44* (2014.11)

(58) Field of Classification Search
USPC ....................................... 375/240.02–240.29
See application file for complete search history.

(56) References Cited

U.S. PATENT DOCUMENTS 5,532,744 A * 7/1996 Akiwumi-Assani et al. ............... 348/390.1
6,275,536 B1 * 8/2001 Chen et al. ............... 375/240.25
(Continued)

FOREIGN PATENT DOCUMENTS

| JP | 2005189975 A | 7/2005 |
| WO | WO 96/06505 A | 2/1996 |
| WO | WO 00/79801 A | 12/2000 |

OTHER PUBLICATIONS

Notice of Reasons for Rejection transmitted Feb. 14, 2012 in Japanese Patent Application No. 2010-550945 (with English translation).
(Continued)

*Primary Examiner* — Leron Beck
(74) *Attorney, Agent, or Firm* — Arent Fox LLP

(57) ABSTRACT

It is an object of the present invention to provide a method, a program, and an apparatus for processing a moving image, allowing efficient and smooth decoding in a simple configuration without heavily depending on the functions of an OS. Herein disclosed is a method for processing a moving image using a plurality of processing units, comprising: a step of dividing a frame of the moving image into a plurality of slices, where a number of the plurality of slices is not a multiple of a number of the plurality of processing units; a processing step, assigned to each of the plurality of slices, for processing each of the plurality of slices; and a switching step for executing slice switching, which switches between the slices to be processed, in the processing step. The method according to the present invention, not limited to the processing of moving images, allows efficient and smooth decoding in a simple configuration, even if the number of slices is not an integer multiple of the number of the processing units, without heavily depending on the functions of an OS.

26 Claims, 11 Drawing Sheets

(56) References Cited

U.S. PATENT DOCUMENTS

2007/0140355 A1* 6/2007 Uchida et al. ............ 375/240.24
2007/0189617 A1* 8/2007 Yamamoto .................... 382/233
2007/0253490 A1* 11/2007 Makino .................... 375/240.24

OTHER PUBLICATIONS

S. Ge, et al., "Efficient Multithreading Implementation of H.264 Encoder . . . ," Information, Communications and Signal Processing, Dec. 15-18, 2003, pp. 469-473.
Moccagatta, "ASO & FMO Impact on AVC Compliance and Complexity," Joint Video Team, Jul. 26, 2002, pp. 1-9.
E.G. Tol Van Der, etl al, "Mapping of H.264 Decoding on a Multi-processor Architecture," SPIE, vol. 5022, Jan. 21, 2003, pp. 707-718.
E.Q. Li, et al., "Implementation of H.264 Encoder on General-Purpose Processors with Hyper-Threading Technology," SPIE, vol. 5308, No. 1, Jan. 20, 2004, pp. 384-395.
International Search Report and Written Opinion dated Apr. 15, 2009 for International Application No. PCT/JP2008/001679.
EP Communication dated May 29, 2015, regarding EP08776749.7.

* cited by examiner

Fig. 2

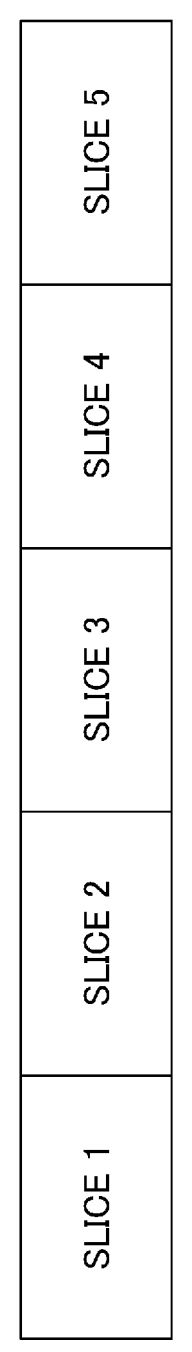

| SLICE 1 | SLICE 2 | SLICE 3 | SLICE 4 | SLICE 5 |

Fig. 7

| CPU301 | $T_0A$ | $T_0B$ | $T_0C$ | $T_0D$ | $T_1D$ |
| --- | --- | --- | --- | --- | --- |
| CPU302 | $T_1A$ | $T_1B$ | $T_1C$ | $T_2C$ | $T_2D$ |
| CPU303 | $T_2A$ | $T_2B$ | $T_3B$ | $T_3C$ | $T_3D$ |
| CPU304 | $T_3A$ | $T_4A$ | $T_4B$ | $T_4C$ | $T_4D$ |
| | $t_0$ | $t_1$ | $t_2$ | $t_3$ | $t_4$ |

Fig. 8

```
thread_func( thread_no )
{
        if( thread_no == 0 )
        {
                switch_position = 100%
        }
        else if( thread_no == 1 )
        {
                switch_position = 75%
        }
        else if( thread_no == 2 )
        {
                switch_position = 50%
        }
        else if( thread_no == 3 )
        {
                switch_position = 25%
        }
        else if( thread_no == 4 )
        {
                switch_position = 0%
        } for( current_percentage = 0% ; current_percentage < switch_position ; current_percentage += step )
        {
                actual operation (decode macroblocks for AVCIntra)
        } if( thread_no == 0 )
        {
                set_event( 1 );
        }
        else if( thread_no == 1 )
        {
                set_event( 2 );
                wait_event( 1 );
        }
        else if( thread_no == 2 )
        {
                set_event( 3 );
                wait_event( 2 );
        }
        else if( thread_no == 3 )
        {
                set_event( 4 );
                wait_event( 3 );
        }
        else if( thread_no == 4 )
        {
                wait_event( 4 );
        } for( ; current_percentage < 100% ; current_percentage += step )
        {
                actual operation (decode macroblocks for AVCIntra)
        }
```

main()
{
        handle0 = create_thread( thread_func, 0 );
        handle1 = create_thread( thread_func, 1 );
        handle2 = create_thread( thread_func, 2 );
        handle3 = create_thread( thread_func, 3 );
        handle4 = create_thread( thread_func, 4 );

wait_for_thread_done( handle0 );
        wait_for_thread_done( handle1 );
        wait_for_thread_done( handle2 );
        wait_for_thread_done( handle3 );
        wait_for_thread_done( handle4 );

destroy_thread( handle0 );
        destroy_thread( handle1 );
        destroy_thread( handle2 );
        destroy_thread( handle3 );
        destroy_thread( handle4 );

}
```

MOVING IMAGE PROCESSING METHOD, PROGRAM AND APPARATUS INCLUDING SLICE SWITCHING

TECHNICAL FIELD

The present invention relates to a method, program and apparatus for processing moving images using a plurality of processing units.

BACKGROUND ART

In general, information quantities of moving images are much larger than for still images, and when being used with communication media and storage media, compression technologies with higher efficiency than for still images are required. Preferable compression technologies for such purposes include, for example, video coding/decoding formats (MPEG1, MPEG2 and MPEG4, which are below referred to in general as MPEG) defined by the MPEG (Moving Picture Experts Group), which is an international standards committee for image compression, the JPEG format (Joint Picture Experts Group) and the JPEG2000 format.

The H.264/AVC format (Advanced Video Coding: ISO/IEC14496-10, below referred to as AVC), which has been standardized in recent years, is a coding standard that improves compression performance by a factor of 1.5 to 2 in comparison with the conventional MPEG2 and MPEG4 video coding formats. Japanese Patent Application Laid-Open Publication No. 2006-229411 discloses an AVC intra coding format (below referred to as the AVC intra standard). The high compression performance of this format is achieved by improving efficiency of (1) an intra prediction scheme that utilizes correlations within (intra) a frame and (2) a variable block movement prediction scheme that utilizes relationships between (inter) frames. Using this method, even in a case in which intra coding of coding for still images is used for moving images, it has been verified that higher compression performance relative to JPEG or JPEG2000 can be achieved.

Meanwhile, for faster computing, processing is being performed using a plurality of cores or a plurality of CPUs. Processing using the plurality of cores or the plurality of CPUs is mainly implemented under the control of functions of an OS (operating system).

In processing of moving images, further increases in speed, with high reliability being maintained, are required. For improved reliability and speeding up of processing, moving images are processed using, for example, a plurality of cores or a plurality of CPUs under the control of an OS.

DISCLOSURE OF INVENTION

Problems to be Solved by the Invention

To process a moving image using a plurality of cores or a plurality of CPUs, the moving image to be processed needs to be divided and assigned to each of the core or the CPU. According to the abovementioned coding format, a moving image is commonly processed by dividing image data constituting the moving image into a predetermined number of slices (each a unit that can be processed independently). Such a method for decoding a moving image, by assigning to a plurality of cores or a plurality of CPUs under the control of a conventional OS, has the following problems.

If processing using a plurality of cores or a plurality of CPUs is implemented under the control of a conventional OS, when the conventional OS generates a new processing, for example, in response to a mouse operation by a user, processing distributed between a plurality of cores or a plurality of CPUs needs to be re-distributed. Consequently, processing efficiency thus obtained may not be simply proportional to the number of cores or CPUs being used.

In addition, if a switching interval of the switch between the CPUs is not sufficiently small with respect to the processing time of the CPUs, certain CPUs may have a heavier workload than others and thus the plurality of CPUs may not efficiently used. On the contrary, an overly small switching interval may increase the overhead of the switching, thus deteriorating the performance of the whole processing.

In addition, the number of slices obtained by dividing the image data may not be an integer multiple of the number of the plurality of CPUs available. In such a case, the image data cannot be efficiently distributed on the basis of the number of the CPUs. Thus, certain slices may be decoded later than other slices. This makes decoding of a piece of image data slower and may interrupt playback if input speed of the moving image is high.

Thus, the present invention is made in view of the abovementioned problems, and it is an object of the present invention to provide a method, a program, and an apparatus for processing a moving image, allowing efficient and smooth decoding in a simple configuration, even if the number of slices is not an integer multiple of the number of processing units such as CPUs, by appropriately providing a switching interval for the switch between CPUs, without heavily depending on the functions of an OS.

It is another object of the present invention to provide a method, a program, and an apparatus for processing, not limited to the processing of moving images, allowing efficient and smooth decoding in a simple configuration, even in a case where the number of slices is not an integer multiple of the number of the processing units, by appropriately providing a switching interval for the switch between the processing units, without heavily depending on the functions of an OS.

Means for Solving the Problems

In accordance with a first aspect of the present invention, there is provided a method implemented by a computer for processing a moving image using a plurality of processing units, comprising: a step of dividing a frame of the moving image into a plurality of slices, where a number of the plurality of slices is not a multiple of a number of the plurality of processing units; a processing step, assigned to each of the plurality of slices, for processing each of the plurality of slices; and a switching step for executing slice switching, which switches between the slices to be processed, in the processing step.

The aforementioned method comprising: a step of dividing a frame of the moving image into a plurality of slices, where a number of the plurality of slices is not a multiple of a number of the plurality of processing units; a processing step, assigned to each of the plurality of slices, for processing each of the plurality of slices; and a switching step for executing slice switching, which switches between the slices to be processed, in the processing step, allows efficient and smooth decoding in a simple configuration, even in a case where the number of slices is not an integer multiple of the number of processing units such as CPUs, by appropriately providing a switching interval for the switch between the processing units, without heavily depending on the functions of an OS. In the aforementioned method, the processing units comprise a plurality of cores that constitute a CPU, or a plurality of CPUs.

According to the present invention, the switching step may comprise: a step of executing an event generation instruction for generating an event triggering processing of another slice when a processing of the slice progresses to a predetermined position; and a step of executing an event standby instruction for waiting for an event to be generated by the event generation instruction and triggering processing of the slice in response to the event.

In the aforementioned method, the switching step comprising: a step of executing an event generation instruction for generating an event triggering processing of another slice when a processing of the slice is progressed to a predetermined position; and a step of executing an event standby instruction for waiting for an event to be generated by the event generation instruction and triggering processing of the slice in response to the event, allows efficient and smooth decoding in a simple configuration, even if the number of slices is not an integer multiple of the number of processing units such as CPUs, by appropriately providing a switching interval for the switch between the processing units, without heavily depending on the functions of an OS.

According to the present invention, the event generation instruction may generate the event on the basis of a first function, for example, the SetEvent Function provided by an OS, and the event standby instruction may wait the event on the basis of a second function, for example, the WaitEvent Function, provided by the OS.

In the aforementioned method, the first function provided by an OS can generate an event, and the second function provided by the OS can cause a thread to wait for the event, thereby enabling implementation in a simple configuration.

Further, according to the present invention, the event generation instruction and the event standby instruction may be realized by a thread storing a register and jumping to another thread, where the thread is a unit for processing the slice.

In the aforementioned method, the event generation instruction and the event standby instruction can be realized by a thread, which is a unit for processing the slice, storing a register in an internal memory and jumping to another thread, thereby enabling the implementation of functions equal to the event generation instruction and the event standby instruction in a simple configuration Further, according to the present invention, the event generation instruction may be positioned at each point at which a processing quantity of each of the threads, which are the individual units for carrying out processing of the respective slices, is divided in accordance with the number of processing units.

In the aforementioned method, the event generation instruction can be positioned at each point at which a processing quantity of each of the threads, which are the individual units for carrying out processing of the respective slices, is divided in accordance with the number of processing units, thereby allowing efficient and smooth decoding in a simple configuration, even in a case where the number of slices is not an integer multiple of the number of the processing units, without heavily depending on the functions of an OS.

Further, according to the present invention, the event generation instruction may be positioned at each point at which a processing quantity of each of the threads, which are the individual units for carrying out processing of the respective slices, is equally divided in accordance with the number of processing units.

In the aforementioned method, the event generation instruction can be positioned at each point at which a processing quantity of each of the threads, which are the individual units for carrying out processing of the respective slices, is equally divided in accordance with the number of processing units, thereby allowing efficient and smooth decoding in a simple configuration, even in a case where the number of slices is not an integer multiple of the number of processing units, without heavily depending on the functions of an OS.

Further, according to the present invention, a value obtained by multiplying the number of threads by the number of portions of each thread divided in accordance with the processing quantity may be a multiple of the number of processing units, and the slice switching is executed in units of the portions. Further, according to the present invention, a value obtained by multiplying the number of threads by the number of portions of each thread divided in accordance with the processing quantity can be a multiple of the number of processing units, and the slice switching can be executed in units of the portions, thereby allowing efficient and smooth decoding in a simple configuration, even if the number of slices is not an integer multiple of the number of processing units, without heavily depending on the functions of an OS.

Further, according to the present invention, processing carried out in the processing step may be decoding of the moving image including the plurality of slices. In the aforementioned method, processing carried out in the processing step can be decoding of the moving image including the plurality of slices, thereby allowing efficient and smooth decoding in a simple configuration, without heavily depending on the functions of an OS.

According to the present invention, the moving image including the plurality of slices may be encoded according to the AVC intra standard. Further, the plurality of processing units may include not only general-purpose CPUs, but also, for example, DSPs (Digital Signal Processors) specific for sound or image processing.

In accordance with a second aspect of the present invention, there is provided a program executable by a computer for processing a moving image using a plurality of processing units, comprising: a step of dividing a frame of the moving image into a plurality of slices, where a number of the plurality of slices is not a multiple of a number of the plurality of processing units; a processing step, assigned to each of the plurality of slices, for processing each of the plurality of slices; and a switching step for executing slice switching, which switches between the slices to be processed, in the processing step.

The aforementioned program, executable by a computer to carry out: a step of dividing a frame of the moving image into a plurality of slices, where a number of the plurality of slices is not a multiple of a number of the plurality of processing units; a processing step, assigned to each of the plurality of slices, for processing each of the plurality of slices; and a switching step for executing slice switching, which switches between the slices to be processed, in the processing step, allows efficient and smooth decoding in a simple configuration, even if the number of slices is not an integer multiple of the number of processing units such as CPUs, by appropriately providing a switching interval for the switch between the processing units, without heavily depending on the functions of an OS.

In accordance with a third aspect of the present invention, there is provided an apparatus for processing a moving image using a plurality of processing units, comprising: a dividing unit for dividing a frame of the moving image into a plurality of slices, wherein a number of the plurality of slices is not a multiple of a number of the plurality of processing units; a processing unit, assigned to each of the plurality of slices, for processing each of the plurality of slices; and a switching unit for executing slice switching, which switches between the slices to be processed.

The aforementioned apparatus comprising: a dividing unit for dividing a frame of the moving image into a plurality of slices, wherein a number of the plurality of slices is not a multiple of a number of the plurality of processing units; a processing unit, assigned to each of the plurality of slices, for processing each of the plurality of slices; and a switching unit for executing slice switching, which switches between the slices to be processed, allows efficient and smooth decoding in a simple configuration, even if the number of slices is not an integer multiple of the number of processing units such as CPU, by appropriately providing switching interval for the switch between the processing units, without heavily depending on the functions of an OS.

BRIEF DESCRIPTION OF THE DRAWINGS

FIG. 2 is a diagram for explaining the structure of slices constituting a frame;

FIG. 7 is a table showing correspondences between CPUs and respective threads;

FIG. 8 is a diagram showing a program executed by the moving image processing apparatus shown in FIG. 4;

FIG. 9 is a diagram showing a program, following that shown in FIG. 8, executed by the moving image processing apparatus shown in FIG. 4;

EXPLANATION OF REFERENCE

1 to 4 Processing Unit
5 Slice Dividing section
6 Switching Section
200 Busline
300 Control Section
301 to 304 CPU
320 Communication I/F (Interface)
330 Main Memory
340 BIOS
350 Display Device
360 I/O Controller
370 Input/Output Apparatus
420 Memory Device

DETAILED DESCRIPTION

Figure 1:
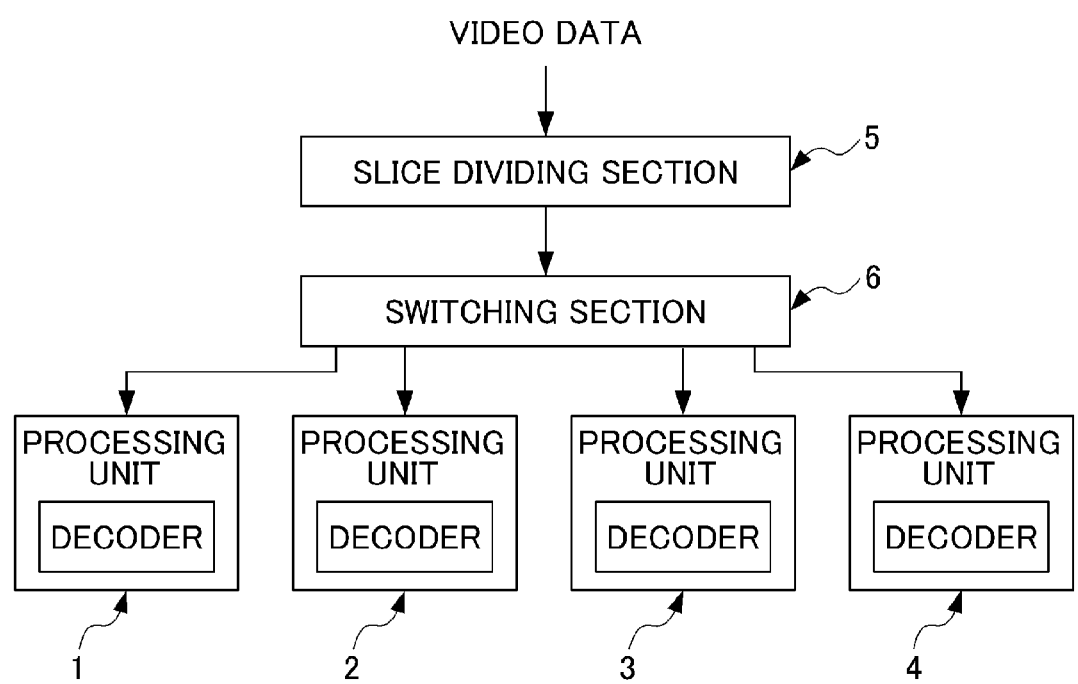
FIG. 1 is a functional structural view of a video processing apparatus that implements a method according to the present invention.
Figure 3:
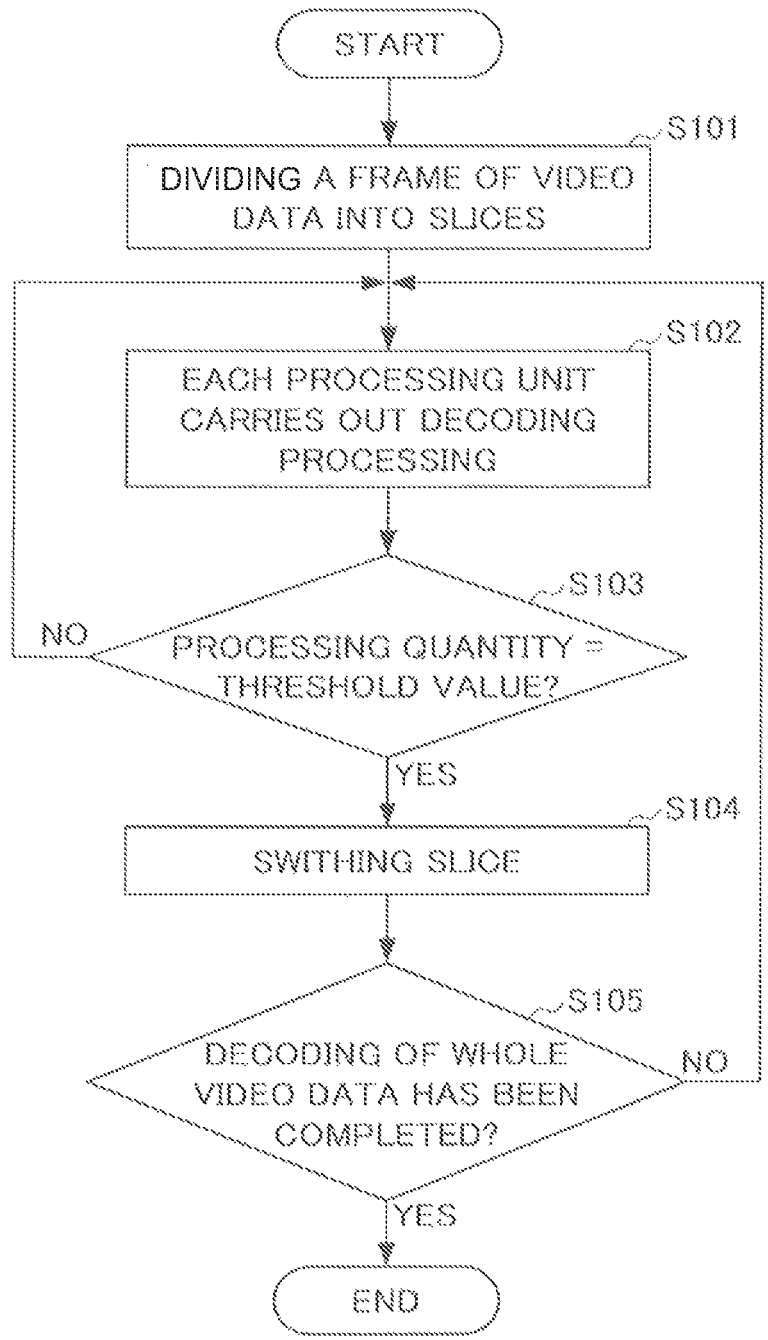
FIG. 3 is a flowchart schematically describing the method according to the present invention.

First, the present invention will be schematically described with reference to FIG. 1 to FIG. 3. FIG. 1 is a functional structural view of a moving image processing apparatus that implements the method according to the present invention. FIG. 2 is a diagram for explaining structure of slices. FIG. 3 is a flowchart schematically describing the method according to the present invention.

As shown in FIG. 1, a moving image processing apparatus that implements a moving image processing method according to the present invention comprises a plurality of processing units 1 to 4, which process and decode moving image data, hereinafter referred to as "video data", constituting a moving image, a slice dividing section 5, which sequentially divides the video data into a plurality of slices when the video data is inputted, and a switching section 6, which switches the plurality of slices divided up by the slice dividing section 5 between the plurality of processing units 1 to 4. The plurality of processing units 1 to 4 process and decode the slices that are switched by the switching section 6. Each of the plurality of processing units 1 to 4 is provided with a decoder.

As shown in FIG. 2, a frame of the moving image is divided into a plurality of slices and processed. In an MPEG standard or the like, a slice is a minimum unit in a sequence of data with a start code, and is a strip of macroblocks with arbitrary lengths, but cannot straddle between pictures. Ordinarily, a macroblock is constituted by a luminance block and a color difference block for a square pixel block of 16 pixels by 16 lines.

When the switching section 6 switches the plurality of slices which have been divided by the slice dividing section 5 to each of the plurality of processing units 1 to 4, tasks, referred to as threads, are created for the decoding processing of the respective slices. According to the present invention, the slice dividing section 5 may divide, into a plural number of slices, the number not being a multiple of the plural number of processing units. As will be described in more detail later, the switching section 6 segments the plurality of slices which have been divided up by the slice dividing section 5, and switches the slices between the plurality of processing units 1 to 4 in accordance with the states of progress in processing of the respectively corresponding threads.

As shown in FIG. 3, the moving image processing method according to the present invention includes the following steps: a step of dividing a frame of video data constituting a moving image into a plurality of slices (step S101); a step of applying decoding processing to the divided plurality of slices at respectively corresponding processing units (step S102); a step of determining whether a processing quantity that has been processed by a respective processing unit has equaled a threshold value (step S103); a step of, when it is determined that a processing quantity has equaled the threshold value, executing slice-switching for switching a slice to be processed (step S104); and a step of determining whether decoding of the whole of the video data has been completed (step S105). In step S105, if it is determined that decoding of the whole image data has not been completed, the processing returns to step S102, and when it is determined that the decoding has been completed, the moving image processing ends. In FIG. 3, for simplicity of description, a single flow of the steps S102 to S104 is described. However, the number of steps S102 to S104 will be the same as the number of processing units processing the video. For example, in a case in which there are four processing units as shown in FIG. 1, parallel processing is executed by flows of the same number as the processing units performing processing, steps $S102_1$ to $S104_1$, steps $S102_2$ to $S104_2$, steps $S102_3$ to $S104_3$ and steps $S102_4$ to $S104_4$.

According to the present invention, the threshold value for comparison in step S103 is decided on the basis of a quantity found by dividing a processing quantity of the slices that are to be processed by the number of processing units. A slice that is being processed is suitably switched in step S104 when a processed quantity thereof has reached the threshold value. Accordingly, the number of the plurality of slices divided up in step S101 need not be an integer multiple of the number of processing units.

The best mode for carrying out the present invention will be described herebelow with reference to the drawings.

Embodiment

A preferred embodiment of a moving image processing apparatus according to the present invention will be described with reference to FIG. 4 to FIG. 7.

Hardware Structure of Moving Image Processing Apparatus

Figure 4:
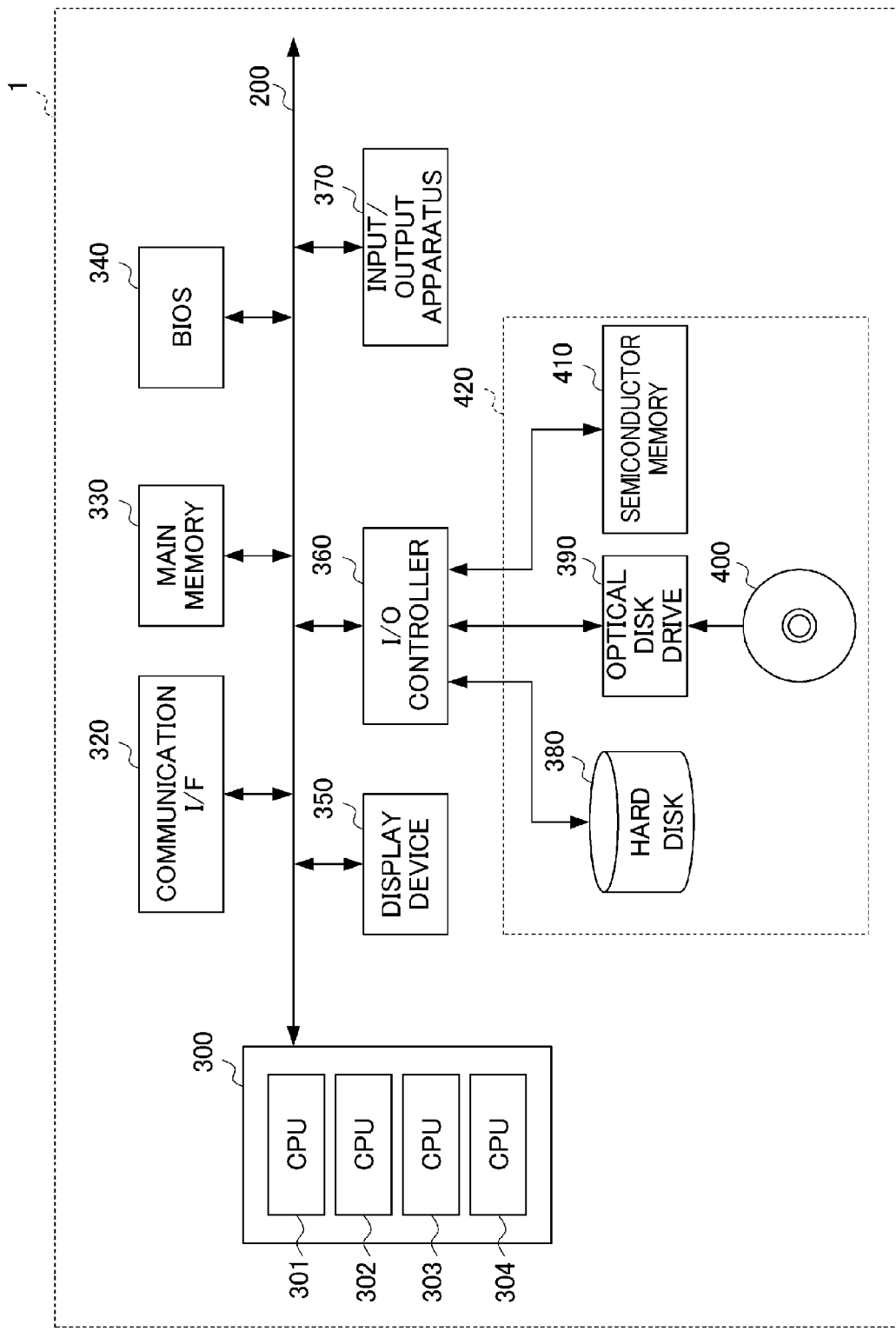
FIG. 4 is a hardware structure diagram of an embodiment of the moving image processing apparatus according to the present invention.

FIG. 4 is a hardware structure diagram of the present embodiment of the moving image processing apparatus according to the present invention.

As shown in FIG. 4, the present embodiment of a moving image processing apparatus 1 comprises a control section 300, which is structured with a group of a plurality of CPUs (central processing units), a busline 200, a communication I/F (interface) 320, a main memory 330, a BIOS (Basic Input/Output System) 340, a display device 350, an I/O controller 360, an input/output apparatus 370 such as a keyboard and a mouse or the like, a hard disk 380, an optical disk drive 390, and a semiconductor memory 410. The hard disk 380, the optical disk drive 390, and the semiconductor memory 410 are collectively referred to as a memory device 420.

The control section 300 is a section that performs overall control of the moving image processing apparatus 1 and, by reading and executing various programs stored on the hard disk 380 as appropriate, cooperates with the hardware described above to realize various functions relating to the present invention. In the present embodiment, the control section 300 is structured with four CPUs 301 to 304.

The communication I/F 320 is a network adapter for when the moving image processing apparatus 1 is exchanging video data, control information or the like with a remote user terminal or the like through a communications network N (not shown). The communication I/F 320 may include a modem, a cable modem and an Ethernet (registered trademark) adapter.

The BIOS 340 records a boot program that is executed by the control section 300 at a time of startup of the moving image processing apparatus 1, a program dependent on the hardware of the moving image processing apparatus 1, and the like.

The display device 350 includes a cathode ray tube display device (CRT), a liquid crystal display device (LCD) or the like.

The I/O controller 360 may be connected to the memory device 420, such as the hard disk 380, the optical disk drive 390 and the semiconductor memory 410, or the like.

In response to control by an operator, the input/output apparatus 370 inputs information required for controlling the moving image processing apparatus 1 from an operator and outputs required information to the operator.

The hard disk 380 stores various programs and data, including an OS (operating system) for causing the present hardware to function as the moving image processing apparatus 1 and a program which realizes the functions according to the present invention. The moving image processing apparatus 1 may employ a separately provided external hard disk (not shown) as an external memory device.

For example, a DVD-ROM drive, a CD-ROM drive, a DVD-RAM drive or a CD-RAM drive may be employed as the optical disk drive 390. In such a case, an optical disk 400 suitable for the respective drive is employed. A program or video data may be read from the optical disk 400 by the optical disk drive 390 and provided to the main memory 330 or the hard disk 380 via the I/O controller 360.

The term "computer" herein used is intended to include an information processing device provided with the memory device 420 and the control section 300 or suchlike. The moving image processing apparatus 1 is structured by an information processing device provided with the memory device 420, the CPUs 301 to 304 and so forth, and this information processing device is to be included in the concept of a computer according to the present invention. In the present embodiment, the CPUs 301 to 304 constitute the processing units 1 to 4 described in FIG. 1. The slice dividing section 5 and the switching section 6 are realized by the control section 300 executing a program stored on the hard disk 380.

For the moving image processing, the CPUs 301 to 304 operate in accordance with respective standards, so detailed descriptions of the moving image processing will not be given. For example, a moving image coded in accordance with the AVC Intra standard may be used. Information which has been decoded by the control section 300 may be displayed by the display device 350, or may be sent to another terminal or the like by the communication I/F 320, or may be stored on the hard disk 380.

Principles of Thread-Switching Processing

Figure 5:
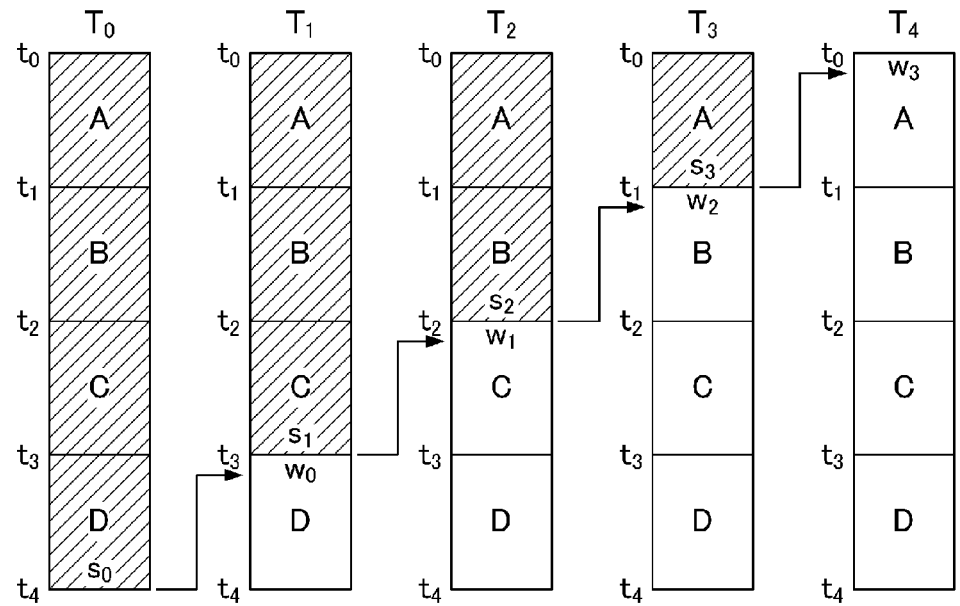
FIG. 5 is a diagram describing threads which are executed by the moving image processing apparatus shown in FIG. 4.
Figure 6:
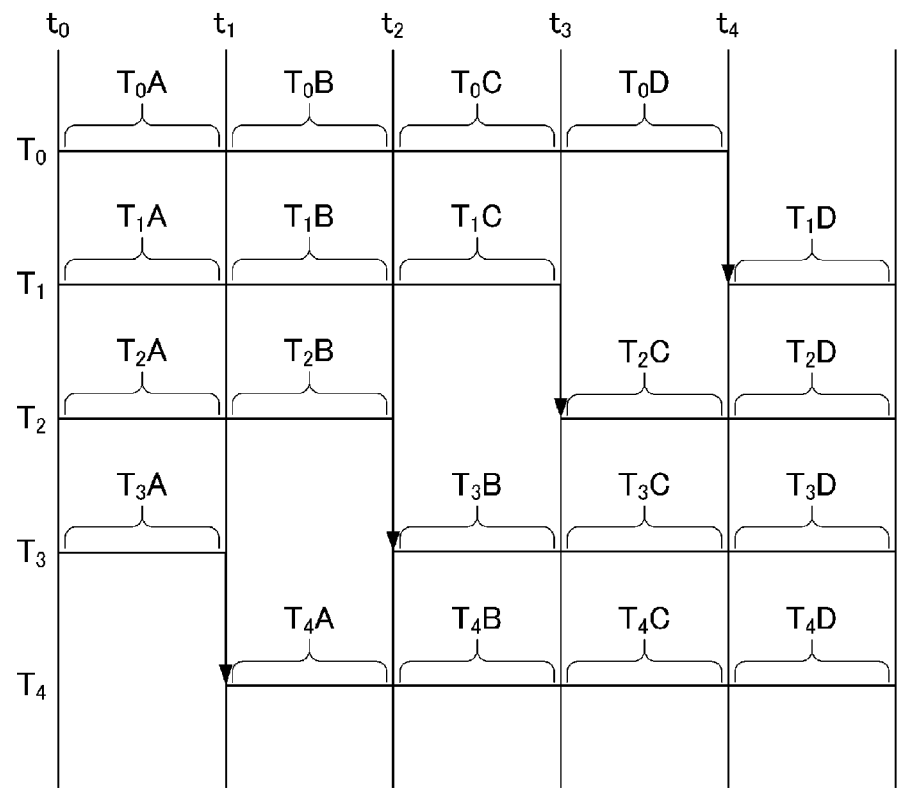
FIG. 6 is a timing chart for describing switching processing that is executed by the moving image processing apparatus shown in FIG. 4.

The processing for switching slices that was described with reference to step S104 of FIG. 3 is processing for switching threads. FIG. 5 to FIG. 7 are diagrams for explaining the principles of the thread-switching processing that is executed by the present embodiment of the moving image processing apparatus 1.

Threads in the present embodiment will be described with reference to FIG. 5. FIG. 5 is a diagram describing threads which are executed by the present embodiment of the moving image processing apparatus 1.

The threads that are provided for processing five slices are referred to, respectively, as threads $T_0$, $T_1$, $T_2$, $T_3$ and $T_4$. The respective points at which the threads are divided are shown by $t_0$, $t_1$, $t_2$, $t_3$ and $t_4$, and the portions of the threads which are demarcated by these points are referred to as A, B, C and D.

According to the present invention, when processing of the threads is divided up, if the number of divided portions is Nd, the number of threads is Nt, and the number of processing units is Nc, then the number of divided portions is decided so as to satisfy the following equation.

$$Nt*Nd=Nc*i \quad (i \text{ is a positive integer})$$

To be specific, a value found by multiplying the number of portions Nd into which a thread is divided by the number of threads Nt is preferably a multiple of the number of processing units Nc.

For example, if the number of processing units performing processing of 5 threads is 4, then the number of portions Nd into which a thread is divided will be calculated such that Nd*5 is a multiple of 4. In the present embodiment, for simplicity of understanding, a description is given with the number of portions into which a thread is divided being four, but the present invention is not limited thus. The number of divided portions Nd may be any number as long as the value found by multiplying the number into which a thread is divided Nd by the number of threads Nt is a multiple of the number of processing units Nc, and various cases are possible such as, for example, 4, 8, 12 or 16.

In the present embodiment, the CPU 301, the CPU 302, the CPU 303 and the CPU 304 are initially assigned to the threads $T_0$, $T_1$, $T_2$ and $T_3$, and no CPU is assigned to thread $T_4$. Accordingly, at $t_0$, the CPUs 301 to 304 commence processing of the respective threads $T_0$, $T_1$, $T_2$ and $T_3$, and processing of the A portion of each of the threads $T_0$, $T_1$, $T_2$ and $T_3$ is executed. Meanwhile, for thread $T_4$, a wait flag $w_3$ is set, which is a flag that issues an event standby instruction to thread $T_4$, to wait for event 3 and then recommence processing. Processing of thread $T_4$ is not carried out from $t_0$.

At $t_1$, processing of the threads $T_0$, $T_1$ and $T_2$ continues, and processing of the B portion of each of the threads $T_0$, $T_1$ and $T_2$ is executed. For thread $T_3$, however, a setting flag $s_3$ is set, which issues an event generation instruction to generate event 3, and a wait flag $w_2$ is set, which issues an event standby instruction to wait for event 2 and then recommence processing. Thus, processing of thread $T_3$ is suspended.

At $t_2$, processing of the threads $T_0$ and $T_1$ continues, and processing of the C portion of each of the threads $T_0$ and $T_1$ is executed. For thread $T_2$, however, a setting flag $s_2$ is set, which issues an event generation instruction to generate event 2, and a wait flag $w_1$ is set, which issues an event standby instruction to wait for event 1 and then recommence processing. Thus, processing of thread $T_2$ is suspended.

At $t_3$, processing of the threads $T_0$ continues, and processing of the D portion of the thread $T_0$ is executed. For thread $T_1$, however, a setting flag $s_1$ is set, which issues an event generation instruction to generate event 1, and a wait flag $w_0$ is set, which issues an event standby instruction to wait for event 0 and then recommence processing. Thus, processing of thread $T_1$ is suspended.

At $t_4$, a setting flag $s_0$ is set, which issues an event generation instruction to thread $T_0$ to generate event 0. Processing of thread $T_0$ is suspended.

In the present embodiment, the event generation instruction may cause the thread to generate an event on the basis of a first function provided by the OS, and an event standby instruction may cause the thread to wait for an event on the basis of a second function provided by the OS. Alternatively, the event generation instruction and event standby instruction may be realized by a thread, which is an individual unit for carrying out processing of a slice, storing a register in an internal memory and jumping to another thread.

The thread-switching processing of the present embodiment will be described more in detail with reference to FIG. 6 and FIG. 7. FIG. 6 is a timing chart for describing switching processing, that is, the thread-switching processing that is executed by the present embodiment of the moving image processing apparatus 1. FIG. 7 is a table showing correspondences between the CPUs 301 to 304 and the thread portions that are processed. As shown in FIG. 2, image data is divided into 5 slices, and the slices are referred to, respectively, as slices 1, 2, 3, 4 and 5.

In the present embodiment, for ease of explanation, a single slice is processed as, for example, a strip of 200 macroblocks. The processing quantity that is the threshold value used when the CPUs 301 to 304 switch threads is a value found by dividing the processing quantities of the slice that is to be processed by the number of CPUs that are to perform processing. Thus, the value found by dividing 200 macroblocks by the number of CPUs, which is 4, is 50 macroblocks.

Firstly, at $t_0$, as shown in FIG. 6, processing of the A portions of the threads $T_0$, $T_1$, $T_2$ and $T_3$ commences. Meanwhile, for thread $T_3$, the wait flag $w_3$ is set, which is the flag that issues an event standby instruction to thread $T_3$ to wait for event 3 and then recommence processing. Thus, no CPU will be assigned to thread $T_4$ until event 3 has been generated (see FIG. 5). Specifically, as shown in FIG. 7, the CPUs 301 to 304 commence processing of threads $T_0$, $T_1$, $T_2$ and $T_3$, respectively, and process the A portion of each of the threads $T_0$, $T_1$, $T_2$ and $T_3$, that is, process 50 macroblocks of the respective slices 1, 2, 3 and 4.

When $t_1$ has been reached, as shown in FIG. 6, processing of the B portions of threads $T_0$, $T_1$ and $T_2$ continues and, at the same time, processing of thread $T_4$ commences. Specifically, as shown in FIG. 7, the CPUs 301 to 303 continue the processing of threads $T_0$, $T_1$ and $T_2$, respectively, and process the B portion of each of the threads $T_0$, $T_1$ and $T_2$, that is, process 50 macroblocks of the respective slices 1, 2 and 3. For thread $T_3$, the setting flag $s_3$ is set, which issues an event generation instruction to thread $T_3$ to generate event 3, and the wait flag $w_2$ is set, which issues an event standby instruction to wait for event 2 and then recommence processing (see FIG. 5). After event 3 has been generated, by the setting flag $s_3$ issuing the event generation instruction for generating event 3, thread $T_3$ is set to a state in which no CPU will be assigned thereto until event 2 has been generated. Meanwhile, because the wait flag $w_3$, which is the flag that issues an event standby instruction to thread $T_4$ to wait for event 3 and then recommence processing, is set (see FIG. 5), processing of thread $T_4$ is recommenced in response to event 3 being generated by thread $T_3$. At this time, as shown in FIG. 7, the CPU 304, which was processing thread $T_3$ just before, takes up the processing and processes the A portion of thread $T_4$, that is, processes 50 macroblocks of the corresponding slice 4.

When $t_2$ has been reached, as shown in FIG. 6, processing of the C portions of threads $T_0$ and $T_1$ and the B portion of thread $T_4$ continues, and, at the same time, processing of thread $T_3$ commences. Specifically, as shown in FIG. 7, the CPUs 301, 302, and 304 continue the processing of threads $T_0$, $T_1$ and $T_4$, respectively, and process the C portion of each of the threads $T_0$ and $T_1$ and B portion of thread $T_4$, that is, process 50 macroblocks of the respective slices 1, 2 and 5. For thread $T_2$, the setting flag $s_2$ is set, which issues an event generation instruction to thread $T_2$ to generate event 2, and the wait flag $w_1$ is set, which issues an event standby instruction to wait for event 1 and then recommence processing (see FIG. 5). After event 2 has been generated, by the setting flag $s_2$ issuing the event generation instruction for generating event 2, thread $T_2$ is set to a state in which no CPU will be assigned thereto until event 1 has been generated. Meanwhile, because the wait flag $w_2$, which is the flag that issues an event standby instruction to thread $T_3$ to wait for event 2 and then recommence processing, is set (see FIG. 5), processing of thread $T_3$ is recommenced in response to event 2 being generated by thread $T_2$. At this time, as shown in FIG. 7, the CPU 303, which was processing thread $T_2$ just before, takes up the processing and processes the B portion of thread $T_3$, that is, processes 50 macroblocks of the corresponding slice 4.

When $t_3$ has been reached, as shown in FIG. 6, processing of the D portion of thread $T_0$ and the C portions of threads $T_3$ and $T_4$ continues, and, at the same time, processing of thread $T_2$ commences. Specifically, as shown in FIG. 7, the CPUs 301, 302, and 304 continue the processing of threads $T_0$, $T_3$ and $T_4$, respectively, and process the D portion of the thread $T_0$ and C portions of threads $T_3$ and $T_4$, that is, process 50 macroblocks of the respective slices 1, 4 and 5. For thread $T_1$, the setting flag $s_1$ is set, which issues an event generation instruction to thread $T_1$ to generate event 1, and the wait flag $w_0$ is set, which issues an event standby instruction to wait for event 0 and then recommence processing (see FIG. 5). After event 1 has been generated, by the setting flag $s_1$ issuing the event generation instruction for generating event 1, thread $T_1$ is set to a state in which no CPU will be assigned thereto until event 0 has been generated. Meanwhile, because the wait flag $w_1$, which is the flag that issues an event standby instruction to thread $T_2$ to wait for event 1 and then recommence processing, is set (see FIG. 5), processing of thread $T_2$ is recommenced in response to event 1 being generated by thread $T_1$. At this time, as shown in FIG. 7, the CPU 302, which was processing thread $T_1$ just before, takes up the processing and processes the C portion of thread $T_2$, that is, processes 50 macroblocks of the corresponding slice 3.

When $t_4$ has been reached, as shown in FIG. 6, processing of thread $T_1$ recommences and, at the same time, processing of threads $T_2$, $T_3$ and $T_4$ continues. Specifically, as shown in FIG. 7, the CPUs 302, 303 and 304 continue the processing of threads $T_2$, $T_3$ and $T_4$, respectively, and process the D portions of the threads $T_2$, $T_3$ and $T_4$, that is, process 50 macroblocks of the respective slices 3, 4 and 5. The setting flag $s_0$ is set, which issues an event generation instruction to thread $T_0$ to generate event 0 (see FIG. 5), and thread $T_0$ is set to a state in which no CPU is assigned thereto. Meanwhile, because the wait flag $w_0$, which is the flag that issues an event standby instruction to thread $T_1$ to wait for event 0 and then recommence processing, is set (see FIG. 5), processing of thread $T_1$ is recommenced in response to event 0 being generated by thread $T_0$. At this time, as shown in FIG. 7, the CPU 301, which was processing thread $T_0$ just before, takes up the processing and processes the D portion of thread $T_1$, that is, processes 50 macroblocks of the corresponding slice 1. FIGS. 8 and 9 show a pseudocode program used for carrying out the above-described processing.

As can be seen from the timing chart shown in FIG. 6, according to the present embodiment of the method, the intervals of switching can be appropriately assured, as being a period from $t_0$ to $t_1$ when the CPU 304 is switching from thread $T_3$ to thread $T_4$, a period from $t_1$ to $t_2$ when the CPU 303 is switching from thread $T_2$ to thread $T_3$, a period from $t_2$ to $t_3$ when the CPU 302 is switching from thread $T_1$ to thread $T_2$, and a period from $t_3$ to $t_4$ when the CPU 301 is switching from thread $T_0$ to thread $T_1$.

The event generation instructions may be positioned at respective points of each of the frames at which a processing quantity of each of the threads, which are the individual units for carrying out processing of the respective slices, is divided in accordance with the number of processing units. Proportions into which the processing quantity of each of the threads is divided or suchlike may be decided with threshold values being set in accordance with either data that is to be processed or data quantities that have been processed. In such cases, it is preferable to give consideration to the capabilities of the processing units that are to perform the processing and to the characteristics of the data that is to be processed. The event generation instructions are preferably positioned at the respective points of each of the frames at which the processing quantity of each of the threads which are the individual units for carrying out processing of the slices are equally divided in accordance with the number of processing units.

Operation of Moving Image Processing Apparatus

Figure 10:
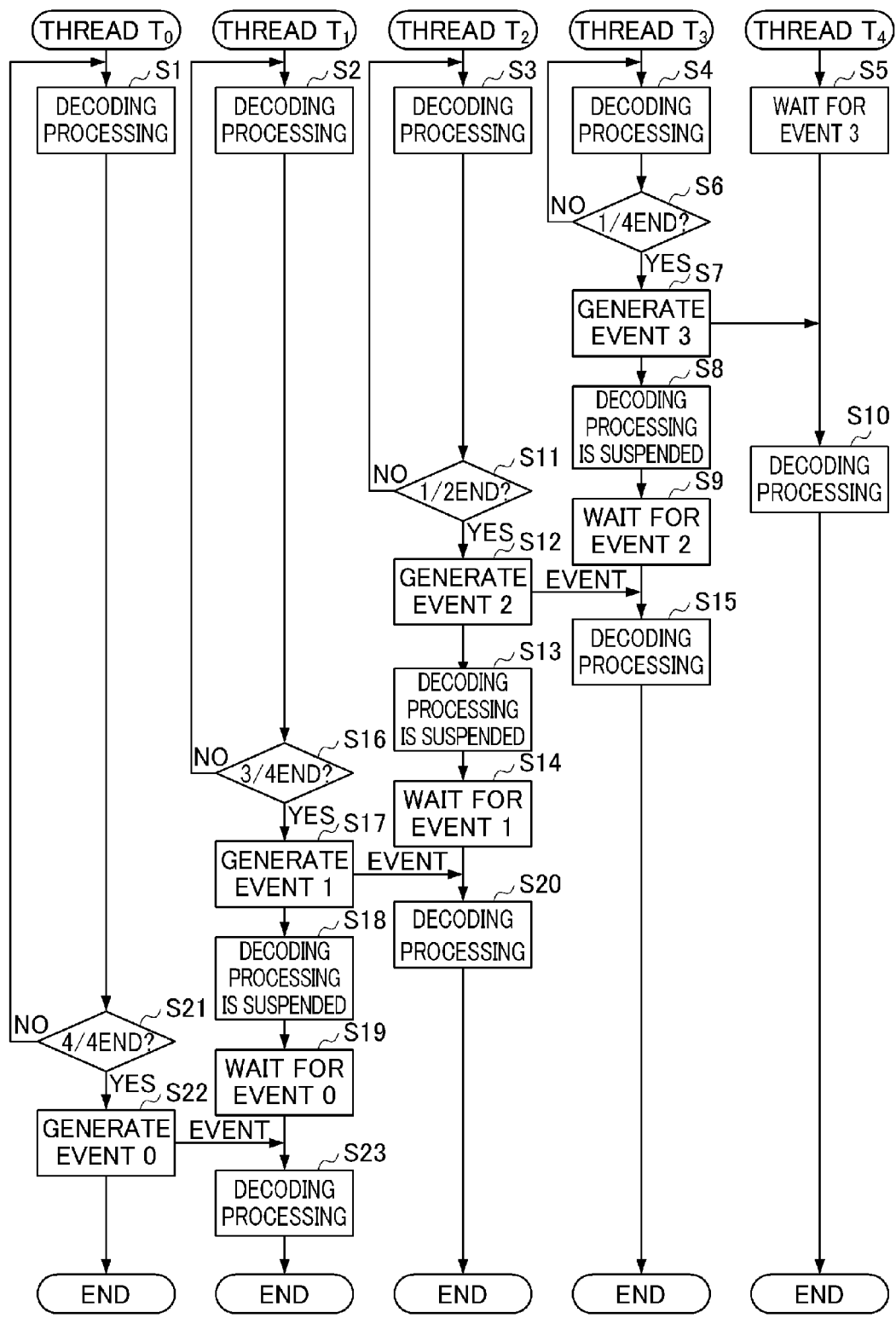
FIG. 10 is a flow chart describing the operation executed by the moving image processing apparatus shown in FIG. 4.

Operations in decoding processing carried out by the present embodiment of the moving image processing apparatus 1 will be described with reference to FIG. 10. Control of the following processing is implemented by the control section 300 executing various programs, including the OS, which have been stored on the hard disk 380.

Firstly, when video data is inputted, the video data is sequentially cut up into five slices 1, 2, 3, 4 and 5, and a thread $T_0$ for decoding slice 1, a thread $T_1$ for decoding slice 2, a thread $T_2$ for decoding slice 3, a thread $T_3$ for decoding slice 4 and a thread $T_4$ for decoding slice 5 are created.

At this time, for thread $T_0$, the processing quantity of the whole thread, that is, the processing quantity of decoding 200 macroblocks, is assigned as a threshold value. When the threshold value is reached, the setting flag $s_0$ will be set, which will issue an event generation instruction to generate event 0, and processing will be suspended.

For thread $T_1$, a processing quantity of three quarters of the whole thread, that is, a processing quantity of decoding 150 macroblocks, is assigned as a threshold value. When the threshold value is reached, the setting flag $s_1$ will be set, which will issue an event generation instruction to generate event 1, the wait flag $w_0$ will be set, which will issue an event standby instruction to wait for event 0 and then recommence processing, and processing will be suspended.

For thread $T_2$, a processing quantity of one half of the whole thread, that is, a processing quantity of decoding 100 macroblocks, is assigned as a threshold value. When the threshold value is reached, the setting flag $s_2$ will be set, which will issue an event generation instruction to generate event 2, the wait flag $w_1$ will be set, which will issue an event standby instruction to wait for event 1 and then recommence processing, and processing will be suspended.

For thread $T_3$, a processing quantity of one quarter of the whole thread, that is, a processing quantity of decoding 50 macroblocks, is assigned as a threshold value. When the threshold value is reached, the setting flag $s_3$ will be set, which will issue an event generation instruction to generate event 3, the wait flag $w_2$ will be set, which will issue an event standby instruction to wait for event 2 and then recommence processing, and processing will be suspended.

For thread $T_4$, the wait flag $w_3$ is set, which will issue an event standby instruction to wait for event 3 and then recommence processing.

In step S1, the CPU 301 is assigned to thread $T_0$ for decoding slice 1, and decoding processing of slice 1 by the CPU 301 is commenced. When the decoding processing commences, control of thread $T_0$ proceeds to step S21, and it is determined whether the processing quantity has reached the threshold value, specifically, whether decoding processing of 200 macroblocks, corresponding to processing of the whole thread, has been completed. If it is determined that the processing quantity has reached the threshold value, control proceeds to step S22. On the other hand, if it is determined that the processing quantity has not reached the threshold value, control returns to step S1 and the decoding processing continues.

In step S2, the CPU 302 is assigned to thread $T_1$ for decoding slice 2, and decoding processing of slice 2 by the CPU 302 is commenced. When the decoding processing commences, control of thread $T_1$ proceeds to step S16, and it is determined whether the processing quantity has reached the threshold value, specifically, whether decoding processing of 150 macroblocks, corresponding to processing of the three quarters of the whole thread, has been completed. If it is determined that the processing quantity has reached the threshold value, control proceeds to step S17. On the other hand, if it is determined that the processing quantity has not reached the threshold value, control returns to step S2 and the decoding processing continues.

In step S3, the CPU 303 is assigned to thread $T_2$ for decoding slice 3, and decoding processing of slice 3 by the CPU 303 is commenced. When the decoding processing commences, control of thread $T_2$ proceeds to step S11, and it is determined whether the processing quantity has reached the threshold value, specifically, whether decoding processing of 100 macroblocks, corresponding to processing of one half of the whole thread, has been completed. If it is determined that the processing quantity has reached the threshold value, control proceeds to step S12. On the other hand, if it is determined that the processing quantity has not reached the threshold value, control returns to step S3 and the decoding processing continues.

In step S4, the CPU 304 is assigned to thread $T_3$ for decoding slice 4, and decoding processing of slice 4 by the CPU 304 is commenced. When the decoding processing commences, control of thread $T_3$ proceeds to step S6, and it is determined whether the processing quantity has reached the threshold value, specifically, whether decoding processing of 50 macroblocks, corresponding to processing of one quarter of the whole thread, has been completed. If it is determined that the processing quantity has reached the threshold value, control proceeds to step S7. On the other hand, if it is determined that the processing quantity has not reached the threshold value, control returns to step S4 and the decoding processing continues.

In step S5, event standby instruction is carried out by thread $T_4$ for decoding slice 5. Specifically, the wait flag $w_3$ is set, which is a flag that issues an event standby instruction to thread $T_4$, to wait for event 3 and then recommence processing.

In step S6, when it is determined that the processing quantity of thread $T_3$ has reached the threshold value, specifically, that processing of one quarter of the whole thread has been completed, meaning that decoding processing of 50 macroblocks has been completed, then control proceeds to step S7.

In step S7, event 3 is generated. Specifically, event setting flag $s_3$, which issues an event generation instruction for generating event 3, is executed, event 3 is generated, and control proceeds to step S8. In step S8, the CPU 304 suspends the decoding processing. Control proceeds to step S9, and event standby processing is performed. Specifically, the wait flag $w_2$, which issues an event standby instruction to wait for event 2 and then recommence processing, is set.

For thread $T_4$, processing commences in response to the wait flag $w_3$ at event 3 which is generated in step S7. Specifically, control proceeds to step S10 and the CPU 304, which has suspended decoding processing of thread $T_3$, commences decoding processing of thread $T_4$. Thereafter, processing of thread $T_4$ ends when the decoding processing of thread $T_4$ has all been completed.

For thread $T_2$, when it is determined in step S11 that the processing quantity of thread $T_2$ has reached the threshold value, specifically, that processing of one half of the whole thread has been completed, meaning that decoding processing of 100 macroblocks has been completed, then control proceeds to step S12.

In step S12, event 2 is generated. Specifically, event setting flag $s_2$ is executed and event 2 is generated, and control proceeds to step S13. In step S13, the CPU 303 suspends decoding processing. In step S14, event standby processing is performed. Specifically, the wait flag $w_1$, for waiting for event 1 and then recommencing processing, is set.

For thread $T_3$, processing is recommenced in response to the wait flag $w_2$ at event 2 which is generated in step S12. Specifically, control proceeds to step S15 and the CPU 303, which has suspended decoding processing of thread $T_2$, recommences decoding processing. Thereafter, processing of thread $T_3$ ends when the decoding processing of thread $T_3$ has all been completed.

For thread $T_1$, when it is determined in step S16 that the processing quantity of thread $T_1$ has reached the threshold value, specifically, that processing of the three quarters of the whole thread has been completed, meaning that decoding processing of 150 macroblocks has been completed, then control proceeds to step S17.

In step S17, event 1 is generated. Specifically, event setting flag $s_1$ is executed and event 1 is generated, and control proceeds to step S18. In step S18, the CPU 302 suspends decoding processing. In step S19, event standby processing is performed. Specifically, the wait flag $w_0$, for waiting for event 0 and then recommencing processing, is set.

For thread $T_2$, processing is recommenced in response to the wait flag $w_1$ at event 1 which is generated in step S17. Specifically, control proceeds to step S20 and the CPU 302, which has suspended decoding processing of thread $T_1$, recommences decoding processing. Thereafter, processing of thread $T_2$ ends when the decoding processing of thread $T_2$ has all been completed.

For thread $T_0$, when it is determined in step S21 that the processing quantity of thread $T_0$ has reached the threshold value, specifically, that processing of the whole thread has been completed, meaning that decoding processing of 200 macroblocks has been completed, then control proceeds to step S22.

In step S22, event 0 is generated. Specifically, the event setting flag $s_0$ is executed and event 0 is generated, and the decoding processing of thread $T_0$ ends.

For thread $T_1$, processing is recommenced in response to the wait flag $w_0$ at event 0 which is generated in step S22. Specifically, control proceeds to step S23 and the CPU 301, which has suspended decoding processing of thread $T_0$, recommences decoding processing. Thereafter, processing of thread $T_1$ ends when the decoding processing of thread $T_1$ has all been completed.

Thus, according to the present embodiment, the following steps can be implemented:

a step of dividing into a plural number of slices, the number not being a multiple of the plural number of processing units; a processing step of performing assignments for each of the plurality of slices and processing each of the plurality of slices; and a switching step of, in the processing step, executing slice-switching for switching the slices that are being processed.

Here, the switching step includes an event generation instruction which, when processing of a slice has progressed as far as a predetermined point, generates an event for causing processing of another slice to be performed. Thus, the slices can be suitably switched without great dependence on the functions of the OS. Accordingly, even if the number of slices is a number that is not an integer multiple of the number of processing units such as CPUs or the like, switching intervals of switching of the processing units can be suitably assured and decoding processing can be carried out efficiently and smoothly.

A structure is also possible in which an event generation instruction may generate an event on the basis of a first function provided by the OS, and an event standby instruction may cause a thread to wait for an event on the basis of a second function provided by the OS. Furthermore, a simple structure may be realized in which an event generation instruction and an event standby instruction can be realized by a thread, which is an individual unit for carrying out processing of a slice, storing a register in an internal memory and jumping to another thread.

As described earlier, the event generation instructions may be positioned at respective points of each of the frames at which a processing quantity of each of the threads, which are individual units for carrying out processing of slices, is divided in accordance with the number of processing units. As will be seen from the foregoing description it has been described in the above that each of the threads carries out processing of one slice for simplicity of understanding. In reality, each of threads, however, carries out processing of a plurality of slices. In order to enable each of threads to carry out processing of a plurality slices, the above operations may be repeated for, for example, the number of times equal to that of slices.

The proportions into which the processing quantity of each of the threads is divided or suchlike may be decided with threshold values being set in accordance with data that is to be processed or data quantities that have been processed. In such cases, consideration may be given to the capabilities of the processing units that are to perform the processing and to the characteristics of the data that is to be processed, and the processing quantity of each of the threads which are the individual units for carrying out processing of the slices may be equally divided up in accordance with the number of processing units and suchlike. Specifically, when a processing quantity of each of the threads is divided up, a value found by multiplying the number of divisions by the number of threads is set so as to be a multiple of the number of processing units. Thus, even if the number of slices is a number that is not an integer multiple of the number of processing units such as CPUs or the like, processing can be carried out efficiently and smoothly with a simple structure and without great dependence on the functions of the OS.

In the present embodiment, a processing quantity, which is a threshold value used for when one of the CPUs 301 to 304 is to switch threads, has been set to 50 macroblocks, which is the value found by dividing the 200 macroblocks that constitute a single slice by the number of processing CPUs, which is 4. However, the present invention is not limited thus. For example, a value may be set for which a data quantity of data to be processed, i.e., data that has not yet been decoded by processing by the CPUs 301 to 304 is divided by the number of processing CPUs.

Generally, a moving image is compressed such that large weighting factors are applied to low frequency components included in the image data and high frequency components go to zero. Consequently, the amounts of image data constituting individual macroblocks are not uniform. Therefore, rather than a value found by dividing a data quantity of compressed data that is yet to be decoded by the number of processing units performing processing, setting a threshold value to a value found by dividing a number of macroblocks that have been obtained by decoding by the number of processing units performing processing enables decoding of a video at higher quality. Furthermore, it is acceptable for a threshold value to be a value found by dividing a quantity to be processed by the number of processing units performing processing, and the divisions need not necessarily be equally divided. For example, one portion of a particular thread may be larger than another portion of the thread, depending on capabilities of the processing units performing processing and on the data to be decoded.

A threshold value need not be specified as a data quantity or a number of decoded macroblocks, and may be specified as a processing duration required for decoding a target number of macroblocks.

Figure 11:
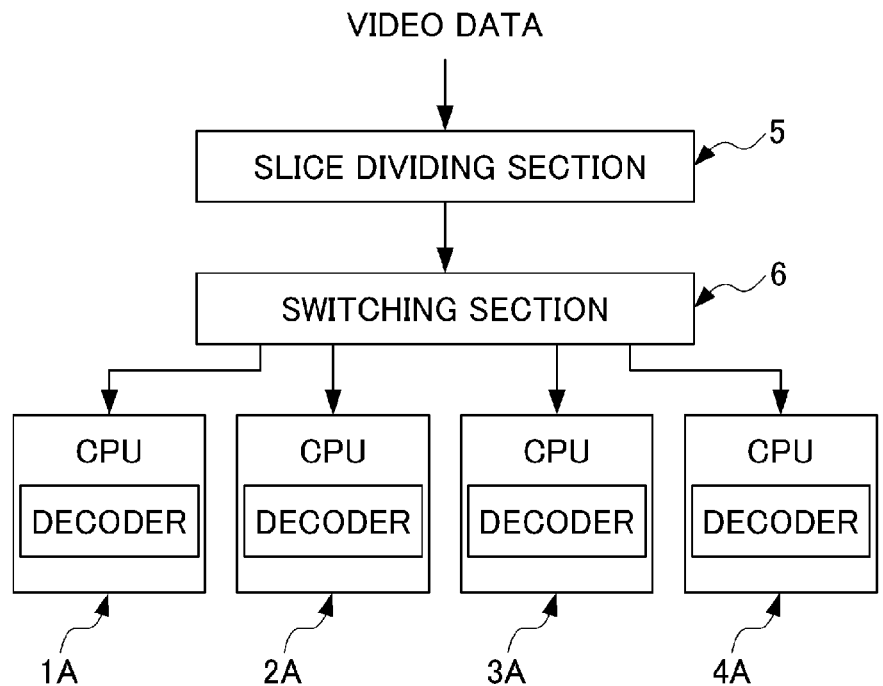
FIG. 11 is a functional structural view of the video processing apparatus shown in FIG. 4.
Figure 12:
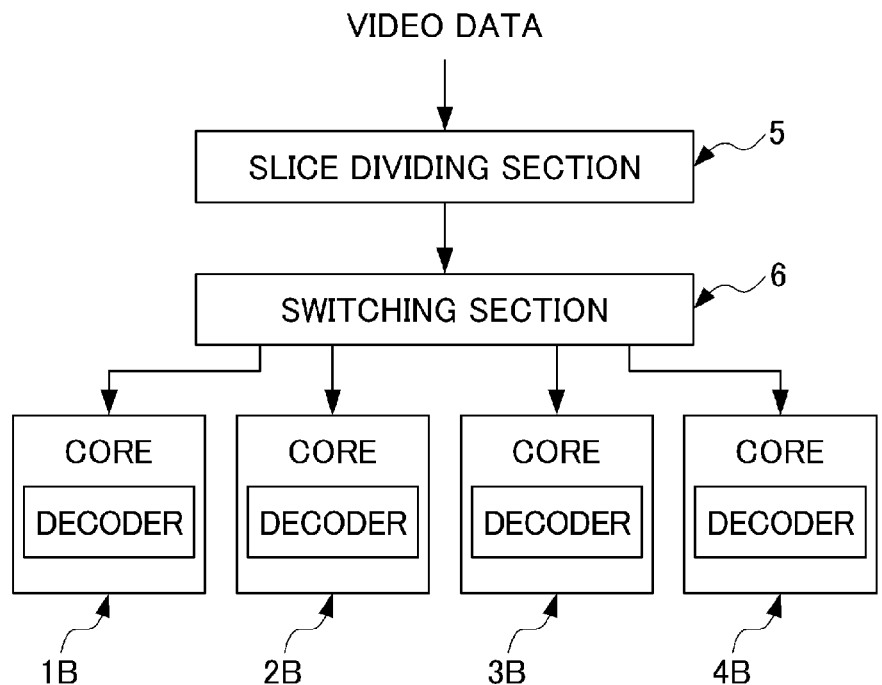
FIG. 12 is a functional structural view of a video processing apparatus, similar to that shown in FIG. 12, in which the processing units is constructed with cores.
Figure 13:
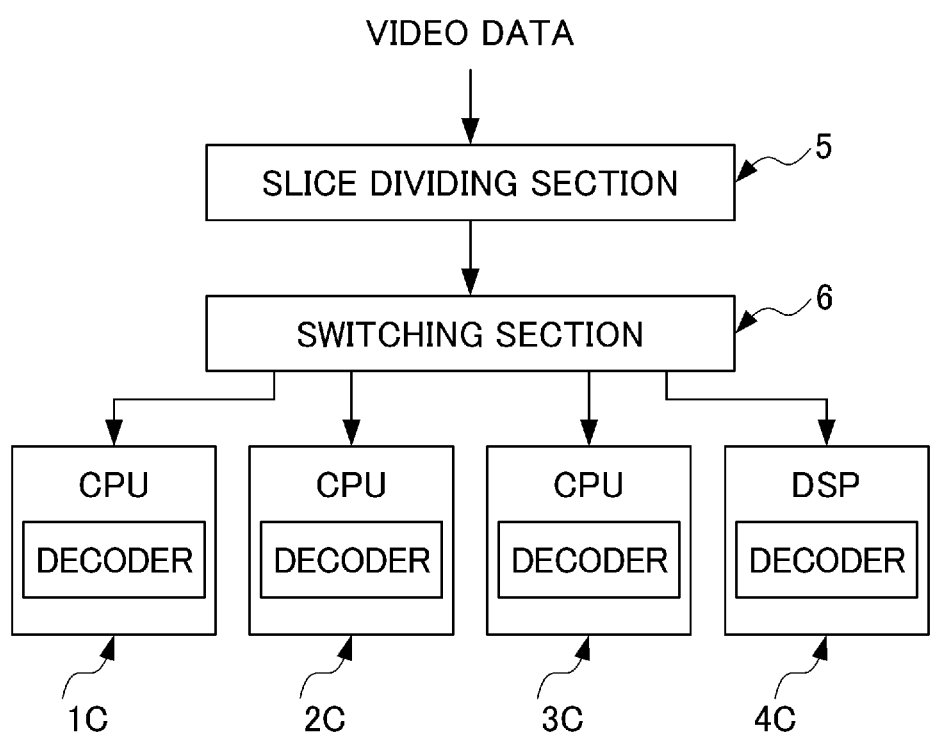
FIG. 13 is a functional structural view of the video processing apparatus, similar to that shown in FIG. 12, in which the processing units are combined with a DPS.

In the present embodiment, as shown in FIG. 4 and FIG. 11, the plurality of processing units are structured as a plurality of CPUs 1A to 4A, but the present invention is not limited thus. As shown in FIG. 12, a plurality of processing units may be structured as, for example, a plurality of cores 1B to 4B that constitute a CPU, or as shown in FIG. 13, may be, for example, a combination of a plurality of CPUs 1C to 3C and a DSP 4C.

An embodiment according to the present invention has been described hereabove, but the present invention is not to be limited to the above-described embodiment. Moreover, the effects described for the embodiment according to the present invention are merely a recitation of the most excellent effects produced by the present invention, and effects resulting from the present invention are not be limited to those described for the embodiment according to the present invention.

For example, application of the present invention is not limited to processing for decoding moving images. The present invention is employable for various applications that require stable processing at high speeds, such as arithmetic calculations, DV (digital video) coding, various simulations, and so forth.

The invention claimed is:

1. A method implemented by a computer for processing a moving image using a plurality of processing units, comprising:
   dividing a frame of the moving image into a plurality of slices, where a number of the plurality of slices is not an integer multiple of a number of the plurality of processing units;
   dividing each slice into a plurality of portions based on total number of processing units;
   processing, assigned to each of the plurality of slices, for processing each of the plurality of slices; and
   executing slice switching, which switches between the slices to be processed, in the processing step, wherein the switching-comprises:
      executing an event generation instruction for generating an event triggered processing of another slice; and
      executing an event standby instruction for waiting for an event to be generated by the event generation instruction and triggering processing of the slice in response to the event;
      wherein the event generation instruction and the event standby instruction are set to be triggered at predetermined positions corresponding to a different portion for each respective slice such that slice switching for each processor provides equally divided quantity of processing by the plurality of processors.

2. A method implemented by a computer for processing a moving image using a central processing unit (CPU) including a plurality of cores, comprising:
   dividing a frame of the moving image into a plurality of slices, where a number of the plurality of slices is not an integer multiple of a number of the plurality of cores;
   dividing each slice into a plurality of portions based on total number of processing units;
   processing, assigned to each of the plurality of slices, for processing each of the plurality of slices; and
   executing slice switching, which switches between the slices to be processed, in the processing step, wherein the switching step comprises:

executing an event generation instruction for generating an event triggered processing of another slice; and executing an event standby instruction for waiting for an event to be generated by the event generation instruction and triggering processing of the slice in response to the event;

wherein the event generation instruction and the event standby instruction are set to be triggered at predetermined positions corresponding to a different portion for each respective slice such that slice switching for each processor provides equally divided quantity of processing by the plurality of processors.

3. A method implemented by a computer for processing a moving image using a plurality of central processing units (CPUs), comprising:

dividing a frame of the moving image into a plurality of slices, where a number of the plurality of slices is not an integer multiple of a number of the plurality of CPUs;

dividing each slice into a plurality of portions based on total number of processing units;

processing, assigned to each of the plurality of slices, for processing each of the plurality of slices; and executing slice switching, which switches between the slices to be processed, in the processing step, wherein the switching step comprises:

executing an event generation instruction for generating an event triggered processing of another slice; and executing an event standby instruction for waiting for an event to be generated by the event generation instruction and triggering processing of the slice in response to the event;

wherein the event generation instruction and the event standby instruction are set to be triggered at predetermined positions corresponding to a different portion for each respective slice such that slice switching for each processor provides equally divided quantity of processing by the plurality of processors.

4. The method according to claim 1, wherein the event generation instruction generates the event on a basis of a first function provided by an operating system (OS), and the event standby instruction waits for the event on a basis of a second function provided by the OS.

5. The method according to claim 1, wherein processing carried out in the processing step includes a decoding of the moving image including the plurality of slices.

6. The method according to claim 5, wherein the moving image including the plurality of slices is encoded according to the AVC intra standard.

7. The method according to claim 1, wherein the plurality of processing units includes at least one digital signal processor (DSP).

8. A non-transitory computer readable medium executable by a computer for processing a moving image using a plurality of processing units, comprising:

code for dividing a frame of the moving image into a plurality of slices, where a number of the plurality of slices is not an integer multiple of a number of the plurality of processing units;

code for dividing each slice into a plurality of portions based on total number of processing units;

code for processing, assigned to each of the plurality of slices, for processing each of the plurality of slices; and code for executing slice switching, which switches between the slices to be processed, in the processing step, wherein the switching comprises:

executing an event generation instruction for generating an event triggered processing of another slice; and executing an event standby instruction for waiting for an event to be generated by the event generation instruction and triggering processing of the slice in response to the event;

wherein the event generation instruction and the event standby instruction are set to be triggered at predetermined positions corresponding to a different portion for each respective slice such that slice switching for each processor provides equally divided quantity of processing by the plurality of processors.

9. An apparatus for processing a moving image, comprising:

a dividing unit for dividing a frame of the moving image into a plurality of slices, wherein a number of the plurality of slices is not an integer multiple of a number of a plurality of processing units, and for dividing each slice into a plurality of portions based on total number of processing units;

a plurality of processing units, wherein each of the plurality of slices is assigned to one of the plurality of processing units, for processing the plurality of slices; and a switching unit for executing slice switching, which switches between the slices to be processed, wherein the switching unit for executing slice switching comprises:

an event generation unit for executing an event generation instruction for generating an event triggered processing of another slice;

an event standby unit for executing an event standby instruction for waiting for an event to be generated by the event generation instruction and triggering processing of the slice in response to the event;

wherein the event generation instruction and the event standby instruction are set to be triggered predetermined positions corresponding to a different portion for each respective slice such that slice switching for each processor provides equally divided quantity of processing by the plurality of processors.

10. The apparatus according to claim 9, wherein the processing unit includes a threshold unit for assigning a threshold value to each of the plurality of slices.

11. The apparatus according to claim 10, wherein the predetermined position corresponds to reaching the threshold value of at least one of the plurality of slices.

12. The apparatus of according to claim 11, wherein the threshold value assigned to each of the plurality of slices includes a processing quantity, and further wherein the processing quantity for each of the plurality of slices is different.

13. The method according to claim 1, wherein the processing step comprises assigning a threshold value to each of the plurality of slices.

14. The method according to claim 13, wherein the predetermined position corresponds to reaching the threshold value of at least one of the plurality of slices.

15. The method according to claim 14, wherein the threshold value assigned to each of the plurality of slices includes a processing quantity, and further wherein the processing quantity for each of the plurality of slices is different.

16. The apparatus according to claim 9, wherein the event generation instruction corresponds to generating the event on a basis of a first function provided by an operating system (OS), and the event standby instruction corresponds to waiting for the event on a basis of a second function provided by the OS.

17. The apparatus according to claim 9, wherein the plurality of processing units are configured to decode the moving image.

18. The apparatus according to claim 17, wherein the moving image including the plurality of slices is encoded according to the AVC intra standard.

19. The apparatus according to claim 9, wherein the plurality of processing units includes at least one digital signal processor (DSP).

20. The computer readable medium according to claim 8, wherein the event generation instruction corresponds to generating the event on a basis of a first function provided by an operating system (OS), and the event standby instruction corresponds to waiting for the event on a basis of a second function provided by the OS.

21. The computer readable medium according to claim 8, wherein the plurality of processing units are configured to decode the moving image.

22. The computer readable medium according to claim 21, wherein the moving image including the plurality of slices is encoded according to the AVC intra standard.

23. The computer readable medium according to claim 8, wherein the plurality of processing units includes at least one digital signal processor (DSP).

24. The computer readable medium according to claim 8, wherein the processing includes assigning a threshold value to each of the plurality of slices.

25. The computer readable medium according to claim 24, wherein the predetermined position corresponds to reaching the threshold value of at least one of the plurality of slices.

26. The computer readable medium according to claim 25, wherein the threshold value assigned to each of the plurality of slices includes a processing quantity, and further wherein the processing quantity for each of the plurality of slices is different.

\* \* \* \* \*